United States Patent [19]

Barnard et al.

[11] Patent Number: 5,202,075
[45] Date of Patent: Apr. 13, 1993

[54] PROCESS FOR MOULDING ARTICLES FROM CURABLE COMPOSITIONS

[75] Inventors: John Barnard; William J. Ould, both of Blackburn, England

[73] Assignee: Imperial Chemical Industries PLC, London, England

[21] Appl. No.: 810,572

[22] Filed: Dec. 20, 1991

Related U.S. Application Data

[63] Continuation of Ser. No. 617,932, Nov. 26, 1990, abandoned, which is a continuation of Ser. No. 902,960, Aug. 29, 1986, abandoned.

[30] Foreign Application Priority Data

Aug. 30, 1985 [GB] United Kingdom ............... 8521652

[51] Int. Cl.$^5$ .................... B29C 45/16; B32B 31/00
[52] U.S. Cl. .................... 264/245; 264/255; 264/331.18; 524/560
[58] Field of Search ............ 264/236, 245, 246, 247, 264/255, 331.18, 347; 428/480, 483, 515, 520, 522; 524/560

[56] References Cited

U.S. PATENT DOCUMENTS

| | | | |
|---|---|---|---|
| 3,420,733 | 1/1969 | Ochi et al. | 264/255 X |
| 3,780,156 | 12/1973 | Cameron | 264/331.18 X |
| 3,878,140 | 4/1975 | Sheppard | 524/560 X |
| 3,949,044 | 4/1976 | Varini | 264/245 |
| 4,168,249 | 9/1979 | Meyer | 428/480 X |
| 4,293,659 | 10/1981 | Svoboda | 264/255 X |
| 4,338,269 | 7/1982 | Russell | 264/236 X |
| 4,350,739 | 9/1982 | Mohiuddin | 264/255 X |
| 4,364,880 | 12/1982 | Howse | 264/245 X |
| 4,405,551 | 9/1983 | Barnard et al. | 264/245 |

FOREIGN PATENT DOCUMENTS

| | | | |
|---|---|---|---|
| 61245 | 9/1982 | European Pat. Off. | 264/245 |
| 56-78958 | 6/1981 | Japan | 264/255 |
| 1493393 | 11/1977 | United Kingdom . | |

Primary Examiner—Leo B. Tentoni
Attorney, Agent, or Firm—Cushman, Darby & Cushman

[57] ABSTRACT

A method of moulding an article having areas of color contrast on the surface comprising coating one surface of a mould with a colored composition prior to filling the mould with a curable composition of contrasting color and curing the composition characterised in that the colored composition comprises at least 25% by weight of (a) a fluid carrier comprising a mixture of 0–100 parts by weight of a polymerizable liquid and correspondingly 100 to 0 parts by weight of a non-polymerizable, volatile, organic solvent, (b) from 0.1 to 10% by weight of the total composition of a colorant in the form of an inorganic pigment or carbon black, or 0.0001 to 1% by weight of an organic pigment or dye, (c) from 0 to 60% by weight of the total composition of a finely divided filler, preferably having a mean particle size of less than 2 microns, (d) 0.1 to 50%, preferably 1 to 10% by weight of a drying oil-modified alkyd resin soluble in the fluid carrier and (e) a preformed polymer soluble in the fluid carrier present at a concentration at least half that of the drying oil modified-alkyd resin.

7 Claims, No Drawings

PROCESS FOR MOULDING ARTICLES FROM CURABLE COMPOSITIONS

This is a continuation of application Ser. No. 07/617,932 filed on Nov. 26, 1990, which was abandoned upon the filing hereof which is a continuation of application Ser. No. 06/902,960, filed Aug. 29, 1986, now abandoned.

This invention relates to a process for providing a colour contrast area on a moulded article and to a composition for providing the colour contrast. The composition is applied to a selected area of a mould surface, in a mould in which an article is to be formed by curing a second composition, which forms the bulk of the article, whereby the contrasted area on the mould surface becomes integral with the cured article during the curing of the second composition.

European Patent Publication No. 61245 describes a procedure of moulding a shaped article having colour contrast areas on desired portions of the moulding in which the contrast areas are provided by coating areas of the mould with a composition comprising a mixture of at least one finely divided filler and at least one finely divided pigment. Preferably the mixture is applied as a suspension in a liquid carrier which is readily volatile at moulding filling temperatures, generally in excess of 50° C. The weight ratio of filler to pigment is in the range 1:1 to 100:1, desirably 5:1 to 50:1.

Since the commercial introduction of this procedure in the context of forming colour-contrasted articles of sanitary ware from curable, high filled, methyl methacrylate compositions the procedure has been widely used but care must be exercised to ensure a satisfactory result, primarily because there is a tendency for the coating to become displaced from the areas of application during the subsequent filling and curing processes resulting in the finished article having a surface which is visually unattractive because of the presence of flaws or discontinuities in the contrasted colour portions of the surface.

The present invention provides a process which provides a more reliable means for obtaining moulded articles having colour contrasted areas.

According to the process of the invention a moulded article having areas of colour contrast on the surface of the article is produced in a process in which a curable composition is cured between corresponding mould halves comprising applying a pigmented composition to pre-selected areas of at least one of the mould halves whilst the mould halves are held at elevated temperatures, closing the mould halves to form a mould cavity, introducing a curable composition into the mould cavity and curing the composition in the cavity characterised in that the pigmented composition comprises (a) a fluid carrier comprising a mixture of 0–100 parts by weight of a polymerisable liquid and correspondingly 100 to 0 parts by weight of a non-polymerisable, volatile, organic solvent,
(b) from 0.1 to 10% by weight of the total composition of a colourant in the form of an inorganic pigment or carbon black, or 0.0001 to 1% by weight of an organic pigment or dye,
(c) from 0 to 60% by weight of the total composition of a finely divided filler, having a mean particle size of less than 5 microns, preferably less than 3 microns,
(d) 0.1 to 50%, preferably 1 to 10% by weight of a drying oil-modified alkyd resin soluble in the fluid carrier and
(e) and a preformed polymer soluble in the fluid carrier present at a concentration of at least half, preferably at least equal to that of the concentration of drying oil-modified alkyd resin, the constituents (a), (b), (c), (d) and (e) totalling 100%, and (a) being present at a concentration of at least 25% by weight of the total composition.

Moulded articles which may be prepared according to the Process of the invention include articles of sanitaryware, particularly integral kitchen sink tops which include a draining surface as part of the sink top. The colour contrast is usually provided on specific areas of the article, such as at the draining area and surrounding rim of a sink. However, the composition of the invention may be applied over the whole exposed surface of the moulded article. In this event, the colour contrast is achieved by applying pigmented compositions according to the invention of different colours in selected areas of the mould, which composition will transfer to the shaped article on moulding.

It is not essential that the composition contains any finely divided filler but when present it is preferred that it should constitute at least 5% by weight and desirably at least 20% by weight of the total composition. When present the finely divided filler should be present in the range 1:1 to 100:1, desirably 5:1 to 50:1 based on the weight ratio of filler to pigment. When the sole colourant is an organic pigment or dye the ratio of filler (when present) to colourant will generally exceed 100:1.

Throughout this specification the term "pigment" is used to mean insoluble materials added to the composition for the purpose of controlling the colour of the compositions. The term "filler" is used to mean insoluble materials added to the composition for the purpose of modifying the physical properties of the composition other than its colour.

Typical inorganic pigments are highly coloured materials such as transparent iron oxides. Typical of the organic pigments are phthalocyanines, quinacridones and endanthrones. Typical of the organic dyes are anthraquinones, monoazo and diazo dyes and perinones.

Typical fillers are described with particular reference to their use in fluid, curable compositions in British Patent Specification No. 1 493 393. They include silicas derived from quartz, cristobalite or tridymite, aluminas, including hydrated aluminas, calcined and uncalcined kaolins and feldspar. In the aforesaid patent specification the particle size of suitable fillers is defined as being a distribution in which at least 95% by number of the filler particles have a size less than 10 microns, with no particles greater than 100 microns. For the purposes of the present invention the filler particles, if present, should have a mean size of less than 5 microns and preferably less than 3 microns.

The drying oil-modified alkyd resin is produced by the interaction of at least three materials, namely a dibasic acid, a polyhydric alcohol and a drying oil fatty acid or alcoholised drying oil. The resins may be produced by a direct esterification reaction of drying oil fatty acids with the dibasic acid and the polyhydric alcohol or by an indirect esterification wherein a drying oil is first alcoholised with a polyhydric alcohol and thereafter esterified with a dibasic acid. Other modifying agents may also be present in the reaction mass such as monocarboxylic acids, for example benzoic acid, or phenolic resins.

The proportion of drying oil may be as low as 20% and as high as 80% or more based on the final resin. Resins having a drying content at the lower end of this range are preferred. The number average molecular weight of the alkyd is preferably in the range 1000 to 5000.

The drying oil acids are preferably derived from naturally occurring, vegetable or marine origin oils, such as linseed oil, corn oil, castor oil, tung oil, tall oil and rosin. The unsaturated acids of these oils may be conjugated or non-conjugated and may be employed as monomer, dimer or trimer. Preferred acids have an iodine value of about 120 to 300 and include linoleic, isolinoleic, linolenic, elaeostearic and abietic acid. Mixed acids of the natural oils are readily produced by the technique known as splitting and are preferred starting materials. Thus dehydrated castor oil fatty acids, linseed oil fatty acids, soyabean fatty acids, tung oil fatty acids, rosin acids and tall oil acids may be used.

The preferred polyhydric alcohols are $C_2$ to $C_6$ aliphatic polyols containing 2 to 6 hydroxy radicals, such as ethylene glycol, glycerine, pentaerythritol and mannitol. Mixtures of polyols may be used.

The dibasic acids which may be used alone or together with another dibasic acid include phthalic acid, phthalic anhydride, isophthalic acid, terephthalic acid (preferably used in admixture), adipic acids and other $C_4$ to $C_{12}$ saturated aliphatic dicarboxylic acids.

Although the fluid carrier for the composition need not contain any polymerisable liquid it is preferred that at least 5 parts per 100 parts by weight of carrier should be a polymerisable liquid having a boiling point of less than 150° C. The choice of polymerisable liquid is preferably chosen so as to be the same as or copolymerisable with the polymerisable material of the composition which is to be cured in the mould to form the bulk of the moulded article. In the case where the bulk of the moulding is to be formed of a curable composition based on methyl methacrylate the polymerisable material of the colour contrast composition of the invention may suitably be methyl methacrylate or styrene.

The non-polymerisable component of the fluid carrier should be sufficiently volatile to become volatilised during the process of applying the composition to the selected areas of a hot mould surface and before introduction of the curable composition. Thus the most suitable materials are those that can be volatilised from surfaces maintained in the range 50° to 100° C. Suitable non-polymerisable materials include methyl ethyl ketone, toluene and xylene.

Whatever the composition of the fluid carrier, it should also perform the function of dissolving the drying oil-modified alkyd resin.

The preformed polymer constituent of the coating should be a polymer which is compatible with the polymer forming the bulk of the eventual shaped article, or not so incompatible with the matrix polymer that its presence gives rise to a reduction in the physical properties of the moulding in the surface regions. When the composition forming the matrix polymer of the bulk of the shaped article is a composition based on methyl methacrylate, polymers or copolymers of methyl methacrylate, particularly relatively low molecular weight materials, that is less than a number average molecular weight of 200,000, preferably less than 50,000 can be usefully employed.

The preformed polymer constituent may be present as a material having surface active properties designed to aid in the dispersion of any solid particulate material present in the colour contrast composition. Such polymeric dispersants are fully described in British Patent Specification No. 1 493 393. These dispersants are useful in providing low viscosity compositions of dispersions of at least 20% by volume of finely divided particulate filler materials in a liquid polymerisable carrier and comprise at least one polymer chain having a molecular weight of at least 500, preferably at least 2,000, solvatable in the liquid polymerisable carrier and one or more groupings capable of associating with, and effecting anchoring to, the particles of the filler material. Typical polymeric dispersants for efficient dispersion of finely divided materials in methyl methacrylate monomer are, for example, a polymer of methyl methacrylate having functional groups such as carboxylic acid, epoxy, hydroxyl and amino groups provided by the copolymerisation of suitable functional group containing monomers.

The concentration of preformed polymer in the colour contrast composition is preferably in the range 0.1 to 20% by weight of the composition and should be at least half, and preferably at least equal to, the concentration of the drying oil modified alkyd in order to provide the shaped article with a sufficiently hard surface.

Accordingly the invention also provides a composition suitable for use in the process of the invention comprising (a) a fluid carrier comprising a mixture of 0–100 parts by weight of a polymerisable liquid and correspondingly 100–0 parts by weight of a non-polymerisable, volatile, organic solvent, (b) from 0.1 to 10% by weight of the total composition of a colourant in the form of an inorganic pigment or carbon black, or 0.0001 to 1% by weight of an organic pigment or dye, (c) from 0 to 60% by weight of the total composition of a finely divided filler, having a mean particle size of less than 5 microns, preferably less than 3 microns (d) 0.1 to 50%, preferably 1 to 10% by weight of a the total composition of a drying oil-modified alkyd resin soluble in the carrier, and (e) and a preformed polymer soluble in the fluid carrier present at a concentration of at least half, preferably at least equal to that of the concentration of drying oil-modified alkyd resin, the constituents (a), (b), (c), (d) and (e) totalling 100%, and (a) being present at a concentration of at least 25% by weight of the total composition.

The composition of the invention not only provides a composition which when applied to selected areas of a mould surface provides a deposit which remains attached to the mould surface in the selected areas during the subsequent filling of the mould with the curable composition but will become integrated into the moulded article during the moulding process so that it is transferred to a pre-selected portion of the moulded article surface and provide an attractive and durable surface. In addition the composition, when of suitable viscosity, provides the advantages of being readily sprayable through available spray equipment and of being easily redispersible into a sprayable composition after periods of storage.

The process of the invention is put into practice by applying a composition of the desired contrasting colour, in respect of the colour of the bulk of the article to be moulded, onto desired areas of the mould surfaces in locations which will correspond to predetermined areas on the surface of the moulded article after the contrasting composition has transferred into the surface of the moulded article as a result of the curing operation. The preferred method of application to the mould surface is by spraying. The mould halves are maintained at elevated temperatures during this mould coating operation and the subsequent mould filling operation. In order to optimise conditions for transfer of the composition from the mould surface so that it is integral with the moulded article it is preferred that a free radical initiator, effective for polymerising the curable material to be introduced as the bulk material of the moulded article should be present in the composition applied to the mould surface. In view of the relatively short life-time of some free radical initiators it is preferred that this is added to the composition immediately prior to applying it to the mould. The free radical initiator used should be one which is an effective initiator at the temperature used in the bulk curing operation and conveniently may be the same catalyst as that used to cure the bulk material in the mould.

The concentration of free radical initiator will depend on the nature of the initiator. Typical initiator concentrations are 0.001 to 3.0% by weight of the composition.

After the contrast-defining composition has been applied to the mould surface, the corresponding parts of the mould are brought together to provide the cavity defining the shape of a desired article. A suitable curable composition is introduced into the mould and is maintained at an elevated temperature until sufficiently cured to be removed from the mould. Although the composition of the invention provides a composition which can be used under wider conditions of tolerance than described in European Patent Publication No. 61245 the introduction of the curable composition into the prepared mould should still be conducted under conditions which avoid direct impingement of the entrant composition onto a mould surface prepared with the colour contrasting composition of the invention. It is a particular advantage of the composition of the invention that after it has been applied to the desired selected areas of the heated mould surface the mould can be filled with the curable composition as soon as it has been assembled and without waiting for any significant period for the coating to cure.

In addition to providing an improved coating composition over those described in European Patent Publication No. 61245 the composition of the invention permits improvements to be effected in the moulding process which will result in improved properties in the finished moulding. These process improvements arise from the need to use high mould temperatures with previously used colour contrast compositions in order to ensure proper transfer of the contrast composition into the moulded article. In the case of highly filled, curable compositions based on methyl methacrylate successful operation required that the surface of the mould against which the show surface of the article is moulded should be of the order of 85° C. during the filling operation and that it should be raised to 100° C. as quickly as possible after the mould had been filled. The temperature of the other mould surface should initially be lower than that at which the show surface is formed but should be raised to the same temperature for the final stages of curing. Use of the composition of the invention has shown that satisfactory results can be obtained at significantly lower mould temperatures, that is, at least 5° C. lower. The mould temperature should nevertheless be at a temperature at which polymerisation of any included polymerisable material can be initiated and at a temperature at which the volatile solvent, if any, can be removed. The mould surface to which the pigmented composition is applied is preferably at a temperature of at least 50° C. This process advantage will result in the moulded product having lower moulded-in stress and improvements in those physical properties which depend on molecular weight of the matrix polymer.

The invention is further described with reference to the following examples.

EXAMPLE 1

A sprayable composition was prepared by mixing the following ingredients

|  | Parts by weight |
| --- | --- |
| Stage 1 | |
| Methyl methacrylate containing 0.01% by weight of polymerisation inhibitor | 47 |
| Glycol dimethacrylate | 1.1 |
| Finely divided silica (mean particle size 2 microns) | 41 |
| Polymeric dispersant (98:2 methyl methacrylate/methacrylic acid copolymer of $M_w$ 110,000 (GPC) | 0.7 |
| γ-methacryloxypropyl trimethoxysilane | 0.1 |
| 97:3 methyl methacrylate:ethyl acrylate copolymer of number average molecular weight 40,000 | 4.8 |
| Drying oil modified Alkyd Resin as a 50% by weight solution in white spirit (available from ICI PLC under the designation X102-744) | 4.8 |
| Stage 2 | |
| Methyl Methacrylate | 44 |
| Polymeric Dispersant as in Stage 1 | 6 |
| Iron oxide | 50 |

100 parts by weight of Stage 1 was blended with 6 parts by weight of Stage 2 and just prior to use 100 parts of this mixture was diluted with 50 parts by weight of slow thinners (available as Autocolour 2K-P850-1276 from Imperial Chemical Industries PLC) 1 part by weight of the free radical initiator bis-(4-t-butylcyclohexyl) peroxydicarbonate was dissolved in this mixture. A kitchen sink mould was used to test the composition. The composition was sprayed onto the predetermined areas of the mould surface (corresponding to the sink rim and draining board areas of the sink) against which the show surface of the sink was to be polymerised, the mould surface being maintained at 80° C. The mould was then closed, the backing mould surface being maintained at 50° C. A curable composition comprising 73% by weight of finely divided quartz silica dispersed in methyl methacrylate monomer (prepared according to Example 5 of British Patent Specification 1 493 393) was injected into the closed mould. The temperatures of the mould surfaces were progressively raised so that after 10 minutes, the temperatures of both moulds were 85° C. The mould temperatures were progressively raised over the next 10 minutes so that both moulds were at 100° C. The composition was substantially completely polymerised at this time but a post-cure period of 10 minutes at 100° C. was used to complete the cycle. The cured article removed from the mould was found to have an attractive colour contrast effect in which the coating composition sprayed onto the mould had transferred into the surface of the sink in a controlled manner, without significant flawing of the sprayed coating occurring.

The composition consisting of the mixture of stage 1 and stage 2 was entirely suitable for sale in admixture as the pigments and fillers remained dispersed for a considerable period of time. Even after the solids had sedimented after prolonged storage the mixture was readily redispersible. Upon addition of the thinners and free radical catalyst the mixture remained stable and in a sprayable condition for adequate time for usage of the dispersion.

EXAMPLE 2

The procedure of Example 1 was followed except in that the free radical catalyst was omitted. A near perfect contrasting colour area was achieved on the sink although there were some signs of cracks under the conditions employed in Example 1. Although use of higher initial polymerisation temperatures overcomes this problem, this example indicates the benefits of including the free radical catalyst.

EXAMPLE 3

The procedure of Example 1 was followed except in that the slow thinners was omitted. Although the composition could still be readily sprayed, a larger droplet size spray was obtained which also had the disadvantage of creating more dust than the composition of Example 1. In the finished article the transition from the contrast area to the base colour area was less attractive.

COMPARATIVE EXAMPLE A

In this Example the composition of Example 1 was made up omitting the oil modified alkyd resin. The composition sprayed satisfactorily but after following the polymerisation procedure of Example 1 the applied contrast coating was found to be flawed through disturbance of the coating either during the filling procedure of subsequent polymerisation of the bulk of the curable composition.

COMPARATIVE EXAMPLE B

In this Example the alkyd resin was replaced by an alternative film forming resin, an acrylic copolymer dissolved in xylene (available from ICI PLC as X190-294).

The resulting sink was unsatisfactory when prepared by the polymerisation procedure because of surface defects.

COMPARATIVE EXAMPLE C

A composition according to Example 1 was prepared except in that the stage 2 dispersion of pigments consisted of 50 parts pigments, 5 parts polymeric dispersant and 45 parts of dibutyl phthalate to replace the methyl methacrylate. Dibutyl phthalate has low volatility at 80° C. The finished sink showed very marked signs of wash-off of the coating. The same performance was experienced using a polymerisation temperature of 100° C.

COMPARATIVE EXAMPLE D

In this Example the alkyd resin of Example 1 was replaced by a urethane modified alkyd resin, designated X101-373, available from ICI PLC. The finished sink was markedly inferior in appearance to that of Example 1.

EXAMPLE 4

The composition of Example 1 was prepared except in that the concentration of alkyd resin in Example 1 was reduced to 0.5 parts by weight. The appearance of the finished sink was almost as good as that of Example 1.

EXAMPLE 5

The general procedure of Example 1 was repeated omitting the finely divided silica from Stage 1 using a variety of drying oil modified alkyl resins. The composition used in the testing was as follows.

| Stage 1 | Parts by weight |
| --- | --- |
| Methyl Methacrylate | 40 |
| Modified Alkyd Resin (as listed below) | 10 |
| 30% solution in methyl methacrylate of 97:3 methyl methacrylate:ethyl acrylate copolymer of Example 1 | 30 |
| Stage 2 as specified in Example 1 | 20 |
| Slow thinners (Autocolour 2K-P850-1276) | 20 |

1 part of bis-(4-t-butyl cyclohexyl) peroxydicarbonate was dissolved in the mixture prior to following the procedure of Example 1 to produce moulded articles.

The modified-alkyd resins evaluated were as follows:
A. X102 - 714; A long oil length drying oil alkyd based on linseed oil/pentaerythritol/phthalic anhydride having an oil length of 67% and a solids content of 62% by weight in white spirit.
B. X101 - 479; A medium oil length drying oil alkyd based on conjugated sunflower oil having an oil length of 52% and a solids content of 56% by weight in a 3:1 white spirit:xylol mixture.
C. X103 - 686; A short oil length semi drying oil alkyd based on dehydrated caster oil/glycerol/phthalic anhydride having an oil length of 43% and a solids content of 50% by weight in xylol.

These materials are marketed by Imperial Chemical Industries PLC.

The performance of these compositions was good, being indistinguishable from each other, but slightly inferior to the performance of the composition of Example 1.

EXAMPLE 6

In this example the general procedure of Example 1 was followed with no finely divided silica being present. The ingredients of the composition were as follows.

| Methyl Methacrylate | 58 parts by weight |
| --- | --- |
| Alkyd Resin (X102-744) of Example 1 | 10 parts by weight |
| 97:3 methyl methacrylate:ethyl acrylate copolymer used in Example 1 (as 30% by weight solution in methyl methacrylate) | 20 parts by weight |
| Pigment Composition (Stage 2 of Example 1) | 12 parts by weight |

A mixture of the above ingredients was diluted with the slow thinners (20 parts) used in Example 1. 1 part of the free radical initiator bis-(4-t-butyl-cyclohexyl)

peroxydicarbonate was dissolved in the mixture and it was used to prepare a kitchen sink using the conditions described in Example 1. A sink of excellent surface appearance at least equal to that of Example 1 was produced.

EXAMPLE 7

The procedure of Example 1 was repeated to form a kitchen sink using the following mixture to provide a colour contrast on the sink rim and draining board area.

| | |
|---|---|
| Methyl Methacrylate | 30 parts by weight |
| Pigment Dispersion (Stage 2 of Example 1) | 2 parts by weight |
| X102-744 alkyd resin | 10 parts by weight |
| Polymeric Dispersant (as used in Example 1) as a 25% by weight solution in methyl methacrylate | 40 parts by weight |
| Slow thinners (as in Example 1) | 20 parts by weight |

The use of this composition gave a marginally worse performance than in Example 6.

We claim:

1. A process of producing a moulded article having areas of colour contrast on the surface of the article in which a highly filled curable methyl methacrylate composition is cured between corresponding mould halves comprising applying a pigmented composition to preselected areas of at least one of the mould halves whilst the mould halves are held at elevated temperatures, closing the mould halves to form a mould cavity, introducing the curable composition into the mould cavity and curing the composition in the cavity characterised in that the pigmented composition comprises (a) a fluid carrier comprising a mixture of 0–100 parts by weight of a polymerisable liquid and correspondingly 100 to 0 parts by weight of a non-polymerisable, volatile, organic solvent, (b) from 0.1 to 10% by weight of the total composition of a colourant in the form of an inorganic pigment or carbon black, or 0.0001 to 1% by weight of an organic pigment or dye, (c) from 0 to 60% by weight of the total composition of a finely divided filler, having a mean particle size of less than 5 microns (d) 0.1 to 50% by weight of a drying oil-modified alkyd resin soluble in the fluid carrier, and (e) a preformed polymer soluble in the fluid carrier present at a concentration of at least half that of the concentration of drying oil-modified alkyd resin, the constituents (a), (b), (c), (d) and (e) totalling 100% and (a) being present at a concentration of at least 25% by weight of the total composition.

2. A process according to claim 1 wherein the pigmented composition applied to preselected areas of the mould contains a free radical generating initiator for the curable composition to be introduced into the mould.

3. A process according to either of claims 1 or 2 in which the fluid carrier of the pigmented composition comprises at least 5 parts per 100 parts of fluid carrier of a polymerisable liquid which is copolymerisable with the curable material of the curable composition to be introduced into the mould and has a boiling point less than 150° C.

4. A process according to claim 1 in which the curable composition is based on methyl methacrylate.

5. A process according to claim 4 in which the pigmented composition comprises at least 5 parts per hundred of the fluid carrier of a polymerisable liquid copolymerisable with methyl methacrylate.

6. A process according to either of claims 4 or 5 in which the mould surface to which the pigmented composition is applied is at a temperature of less than 85° C. and at least 50° C.

7. A shaped article produced according to the process of claim 1 having a color contrast surface layer over at least part of the surface of the shaped article wherein the layer comprises a mixture of a colorant selected from an inorganic pigment, carbon black, an organic pigment and a dye, and a drying oil modified alkyd resin embedded in cured methyl methacrylate resin.

* * * * *